(12) United States Patent
Bates

(10) Patent No.: US 6,378,393 B1
(45) Date of Patent: Apr. 30, 2002

(54) METHOD AND APPARATUS FOR MANUALLY SHIFTING AN ELECTRONICALLY CONTROLLED TRANSMISSION

(75) Inventor: Wayne L. Bates, Grand Blanc, MI (US)

(73) Assignee: Kelsey-Hayes Company, Troy, MI (US)

( * ) Notice: Subject to any disclaimer, the term of this patent is extended or adjusted under 35 U.S.C. 154(b) by 0 days.

(21) Appl. No.: 09/574,295

(22) Filed: May 19, 2000

(51) Int. Cl.$^7$ ............................................. F16H 59/02
(52) U.S. Cl. .................. 74/473.18; 74/335; 74/473.12; 74/625; 192/219.6
(58) Field of Search ......................... 74/473.12, 473.18, 74/335, 625; 192/219.6, 220.7

(56) References Cited

U.S. PATENT DOCUMENTS

| | | | |
|---|---|---|---|
| 3,894,442 A | * 7/1975 | Hembree | 200/61.85 |
| 4,065,983 A | * 1/1978 | Mimura | 280/236 |
| 4,463,628 A | * 8/1984 | Ahlschwede et al. | 192/3.57 |
| 4,843,901 A | 7/1989 | Peterson et al. | |
| 4,944,194 A | 7/1990 | Tanoue et al. | |
| 5,241,292 A | * 8/1993 | Bjorknas et al. | 335/238 |
| 5,370,015 A | 12/1994 | Moscatelli | |
| 6,047,799 A | 4/2000 | Ahnert et al. | |

FOREIGN PATENT DOCUMENTS

JP          10-110815         * 4/1998

* cited by examiner

*Primary Examiner*—Allan D. Herrmann
(74) *Attorney, Agent, or Firm*—Tarolli, Sundheim, Covell, Tummino & Szabo L.L.P.

(57) ABSTRACT

A method and apparatus are provided for manually shifting an electrically controlled transmission (14) to a desired gear setting in the event of a failure includes unlocking a manual shift mechanism (90) from a non-actuatable condition. The manual shift mechanism (90) is linearly moved from the non-actuated condition toward an engageable position with a link arm (70) to linearly move the link arm in response to further linear movement of the manual shift mechanism after engagement therewith. A transmission gear (16) is rotated to manually shift the transmission (14) to the desired gear setting through linear motion of the link arm (70).

39 Claims, 4 Drawing Sheets

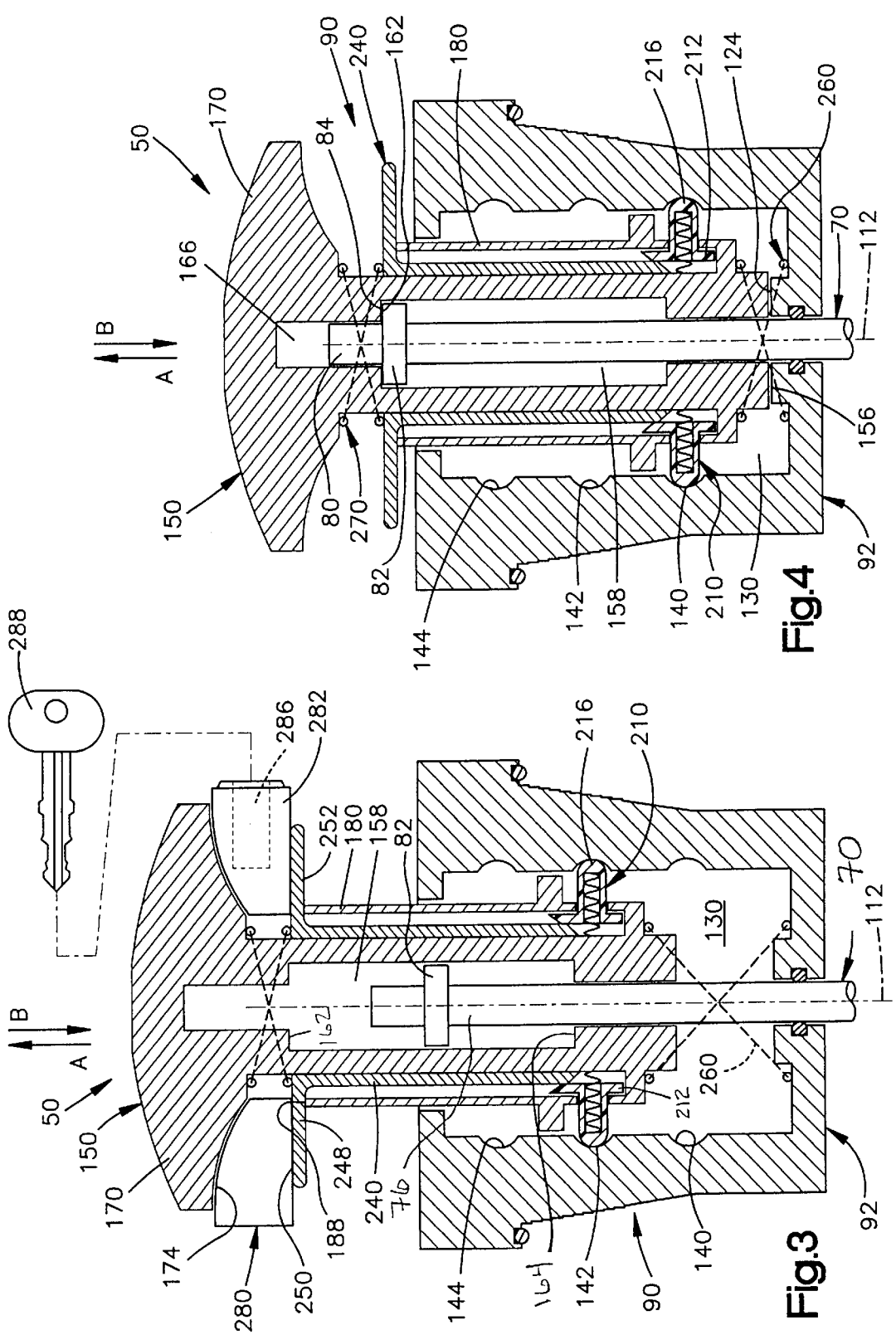

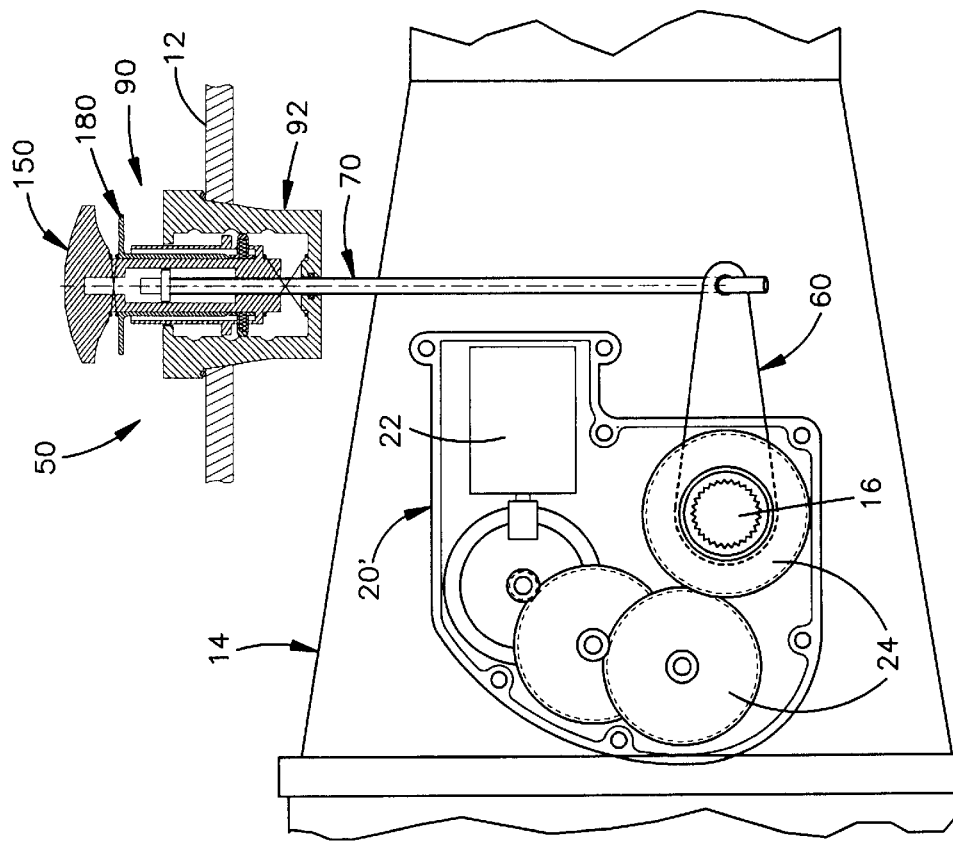
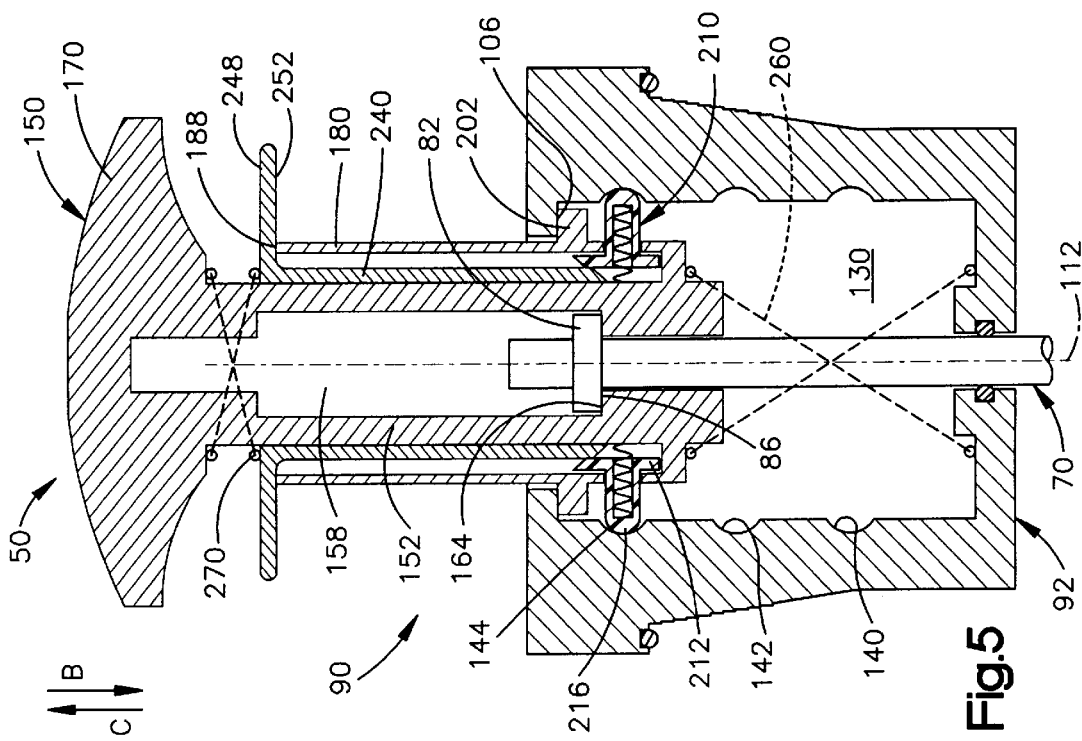

METHOD AND APPARATUS FOR MANUALLY SHIFTING AN ELECTRONICALLY CONTROLLED TRANSMISSION

TECHNICAL FIELD

The present invention relates to a method and apparatus for manually shifting a transmission in an electronically controlled transmission system for a vehicle.

BACKGROUND OF THE INVENTION

It is known to use an electronically controlled transmission system, commonly referred to as a "shift-by-wire" system, in vehicles. According to one known system, an input shaft projects outward from a transmission gear housing and is rotatable to select/shift gears in the transmission. The electronically controlled transmission system is shifted between gears by an electronic actuator that is operatively coupled to the input shaft. The actuator rotates the input shaft in response to an input signal from a manually operated gear selector. A variety of constructions are known for the gear selector, including a movable lever and a set of push-button switches.

In the event that some type of failure, such as an electrical failure, occurs in an electronically controlled transmission system, it is desirable to have a mechanical back-up mechanism which permits shifting between at least a portion of the gears in the transmission. For example, if an electrical failure occurs in the transmission system, it is desirable to have a mechanism for manually shifting the transmission into neutral so that the vehicle can be towed for service.

SUMMARY OF THE INVENTION

In accordance with one aspect of the present invention, a method is provided for manually shifting an electrically controlled transmission to a desired gear setting in the event of a failure. The method comprises the steps of unlocking a manual shift mechanism from a non-actuatable condition, and linearly moving the manual shift mechanism from the non-actuated condition toward an engageable position with a link arm. The link arm moves linearly in response to further linear movement of the manual shift mechanism after engagement with the mechanism. A transmission gear rotates to manually shift the transmission to the desired gear setting through linear motion of the link arm.

In accordance with one exemplary embodiment of the invention, the step of rotating a transmission gear includes the step of translating linear motion of the link arm to rotational motion of the transmission gear through a lever pivotally connected to the link arm and to a rotatable gear of the transmission that manually selects gear settings.

According to another exemplary embodiment of the invention, the step of unlocking the manual shift mechanism includes the step of retracting a spring-loaded detent member from a locked position to an unlocked position.

In further accordance with yet another exemplary embodiment, the step of linearly moving the manual shift mechanism toward an engageable position includes the step of moving a coaxial outer sleeve surrounding the link arm a predetermined distance to overcome a lost motion distance between the outer sleeve and the link arm, wherein further movement of the outer sleeve beyond the predetermined distance results in linear movement of the link arm.

In accordance with another aspect of the present invention, an apparatus for manually shifting gears in an electronically controlled transmission in the event of a system failure is provided. The transmission has a rotatable input shaft for selecting between the gears. The apparatus comprises a link arm coupled with the input shaft. The link arm is linearly movable to cause rotation of the input shaft. A manually engageable mechanism is engageable with the link arm and movable relative to the link arm. The mechanism is linearly movable to cause the link arm to move linearly and to thereby manually select a gear in the transmission.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 3 is a sectional view similar to FIG. 2 illustrating components of the apparatus in a first condition;

FIG. 4 is a sectional view similar to FIG. 3 illustrating the components of the apparatus in a second condition;

FIG. 5 is a sectional view similar to FIG. 4 illustrating the components of the apparatus in a third condition; and FIG. 6 is a schematic side view of an alternate embodiment of an electrically controlled transmission system with the apparatus of FIG. 1 for manually shifting the transmission.

DESCRIPTION OF PREFERRED EMBODIMENTS

Figure 1:
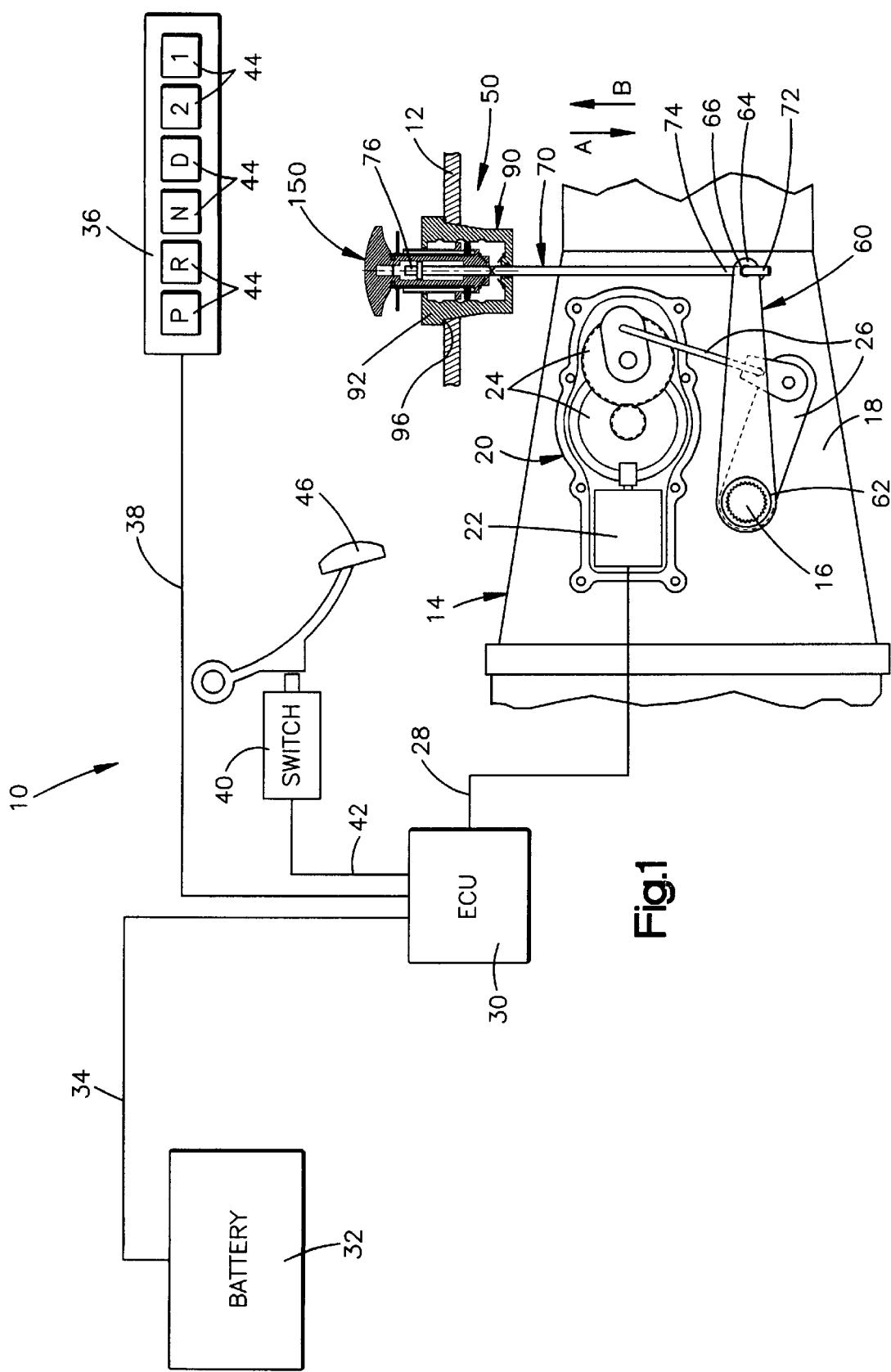
FIG. 1 is a schematic diagram of an electronically controlled transmission system having an apparatus for manually shifting the transmission.

The present invention relates to a method and apparatus for manually shifting a transmission in an electronically controlled transmission system. As representative of an exemplary embodiment of the present invention, FIG. 1 illustrates an electronically controlled transmission system 10 in a vehicle 12. The system 10 includes a shiftable vehicle transmission 14 having a plurality of gears (not shown) and an input shaft 16 that rotates to select/shift between gears in the transmission. The input shaft 16 projects radially outward of a housing 18 for the transmission 14.

The system 10 further includes an electronic actuator 20 secured to the transmission housing 18 and operatively coupled with the input shaft 16 for rotating the input shaft. The actuator 20 includes an electric motor 22 drivably connected to a plurality of gears 24, which are, in turn, operatively connected to output linkage 26 connected to the input shaft 16. An input signal, carried by wires 28, energizes the electric motor 22 to cause the gears 24 to rotate. The gears 24 of the actuator 20 drive the output linkage 26 to cause the input shaft 16 to rotate.

An electronic control unit ("ECU") 30 is electrically connected with the actuator 20 by the wires 28. A source of electrical power in the vehicle, such as a battery 32, is connected to the ECU 30 by wires 34. The ECU 30 is further electrically connected with a manually engageable gear selector 36 by wires 38, and with a brake interlock switch 40 by wires 42. The gear selector 36 includes a plurality of manually engageable buttons 44 corresponding to selectable gears in the transmission 14. As is known in the art, the brake interlock switch 40 is used by the ECU 30 require the vehicle's brake pedal, indicated schematically at 46, to be depressed before the ECU will permit the transmission 14 to be shifted out of a "park" condition. The ECU 30 receives signals,from the brake interlock switch 40 and from the gear selector 36, and provides a corresponding input signal to the actuator 20.

The system 10 further includes an apparatus 50 for manually shifting the transmission 14 to select a particular gear in the transmission in the event of a failure of one of the aforementioned components in the electronically controlled transmission system 10. The apparatus 50 comprises a lever 60 connected to the input shaft 16, a link arm 70 connected to the lever 60, and a mechanism 90 for moving the link arm.

The lever 60 preferably has a splined connection to the input shaft 16 as shown in FIG. 1, however it is contemplated that the lever could be connected to the input shaft by another suitable means. The splined connection of the lever 60 and the input shaft 16 is located at a first end 62 of the lever. At an oppositely disposed second end 64, the lever 60 is pivotally connected to the link arm 70. As shown in FIG. 1, the pivotable connection preferably comprises an opening 66 in the lever 60 through which a tab 72 on a lower end 74 of the link arm 70 projects. It should, however, be apparent that any suitable pivotable connection could be used in place of the illustrated connection between the lever 60 and the link arm 70.

Figure 2:
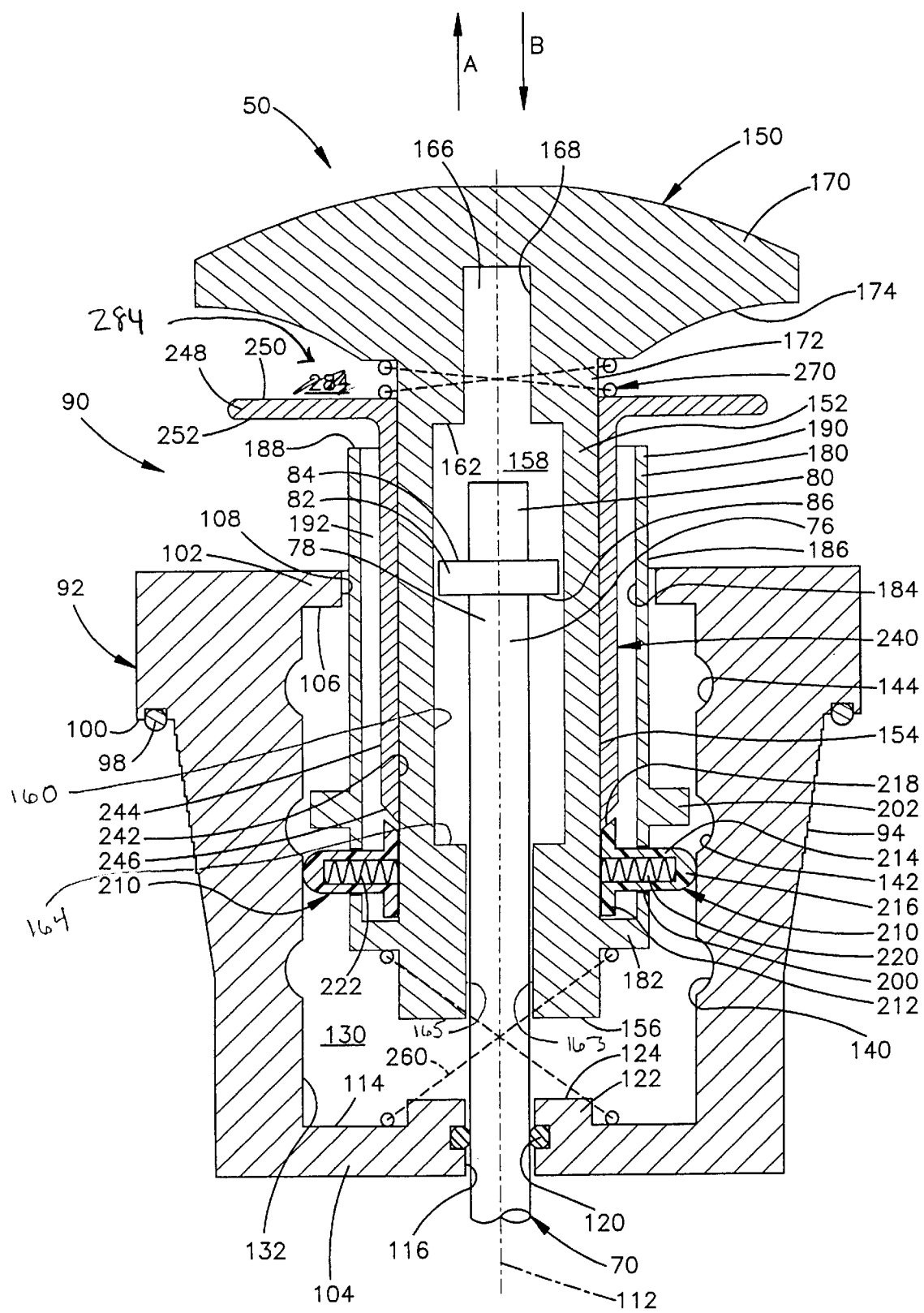
FIG. 2 is a sectional view of the apparatus of FIG. 1.

An upper end portion 76 of the link arm 70 is disposed within the mechanism 90. As shown in FIG. 2, the upper end portion 76 includes a cylindrical shaft portion 78, a guide portion 80, and a radially extending collar 82 separating the shaft portion and the guide portion. The collar 82 has an upper surface 84 and a lower surface 86. The collar 82 is engageable with the mechanism 90 as described below.

The mechanism 90 is mounted to the vehicle 12 in a suitable location, such as the vehicle floor adjacent the driver's seat (not shown). The mechanism 90 comprises a housing 92, a manually engageable handle 150, a pair of detent members 210, a coaxial sleeve 240, and first and second spring members 260 and 270.

The housing 92 includes a tapered, stepped surface 94 (FIG. 2) which is pressed into an opening 96 (FIG. 1) in the vehicle 12 to attach the mechanism 90 to the vehicle. Alternatively, the housing 92 could be bolted in the vehicle 12, or the surface 94 and the housing could be threaded to screw into the opening 96. Preferably, an O-ring 98 (FIG. 2) is located on a downwardly facing surface 100 of the housing 92 to seal around the opening 96 through the vehicle floor.

The housing 92 has an upper end wall 102 and a lower end wall 104. The upper end wall 102 includes an upper end surface 106 and an opening 108 defined by a cylindrical surface centered on an axis 112. The lower end wall 104 includes a lower end surface 114 and an opening 116 defined by a cylindrical surface centered on the axis 112. The link arm 70 extends through the opening 116 in the lower end wall 104. Preferably, an O-ring 120 is located in the opening 116 to seal against the shaft portion 76 of the link arm 70. The lower end surface 114 includes a raised pilot portion 122 centered on the axis 112. The pilot portion 122 includes a stop surface 124. The opening 116 extends through the pilot portion 122.

Between the end walls 102 and 104, the housing 92 has an internal cavity 130 defined in part by a cylindrical inner surface 132 centered on the axis 112. The cavity 130 in the housing 92 is further defined by the upper end surface 106 and the lower end surface 114. The inner surface 132 of the housing 92 includes three annular grooves spaced apart along the axis 112. A first groove 140 is located nearest the lower end wall 104. A second groove 142 is located between the first groove 140 and a third groove 144 which is located nearest the upper end wall 102. Each of the three grooves 140, 142, and 144 has an arcuate shape.

The handle 150 is partially disposed in the cavity 130 in the housing 92 and is centered on the axis 112. The handle 150 includes a main body portion 152, a knob portion 170, and a detent carrier portion 180. The knob portion 170 extends from an upper end 172 of the main body portion 152 and is manually engageable by a vehicle operator. The knob portion 170 includes an arcuate surface 174.

The main body portion 152 of the handle 150 has a cylindrical outer surface 154 and a radially extending terminal end surface 156. The main body portion 152 further includes a chamber 158 centered on the axis 112. The chamber 158 is defined in part by a cylindrical first surface 160 and oppositely disposed first and second stop surfaces 162 and 164. A cylindrical surface 163 defines a bore 165 that extends between the second stop surface 164 and the terminal end surface 156. A guide section 166 of the chamber 158 extends into the knob portion 170 of the handle 150 and is defined by a cylindrical second surface 168.

The upper end portion 76 of the link arm 70, including the collar 82, is disposed in the chamber 158 in the handle 150. The shaft portion 76 of the link arm 70 extends through the bore 165 in the main body portion 152 and supported for linear movement relative to the handle 150 by the bore. The guide portion 80 of the link arm 70 is receivable in the guide section 166 of the chamber 158 inside the handle 150.

The detent carrier portion 180 of the handle 150 comprises a coaxial sleeve that encircles the main body portion 152 of the handle. The detent carrier portion 180 is connected with the main body portion 152 by a radially extending first flange 182. The detent carrier portion 180 includes parallel cylindrical inner and outer surfaces 184 and 186, and a radial end wall 188 at an upper end 190. A tubular chamber 192 is defined between the inner surface 184 of the detent carrier portion 180 and the outer surface 154 of the main body portion 150.

The detent carrier portion 180 of the handle 150 further includes a diametrically opposed pair of radially extending apertures 200 adjacent the first flange 182. An annular second flange 202 extends radially outward from the outer surface 186 of the detent carrier portion 180 just above, as viewed in the Figures, the axial location of the apertures 200. The a second flange 202 is engageable with the upper end surface 106 of the housing 92 to prevent the handle 150 from being pulled out of the cavity 130 in the housing.

The detent members 210 are disposed diametrically opposite one another and are identical in construction. Each detent member 210 has a base portion 212 and a radially projecting pin portion 214 with a rounded tip 216. The pin portion 214 of each detent member 210 extends through, and is supported for radial movement by a respective one of the apertures 200 in the detent carrier portion 180 of the handle 150. The base portion 212 of each detent member 210 includes an angled surface 218. A recess 220 is formed inside each of the detent members 210. A spring 222 is located inside the recess 220 in each detent member 210 and biases the detent member radially outward away from the main body portion 152 of the handle 150.

The coaxial sleeve 240 is disposed in the tubular chamber 192 between the main body portion 152 of the handle 150 and the detent carrier portion 180 of the handle. The sleeve 240 encircles a portion of the main body portion 152 and is axially movable relative to the handle 150. The sleeve 240 includes cylindrical inner and outer surfaces 242 and 244. The inner surface 242 of the sleeve 240 is slidably engaged with the outer surface 154 of the main body portion 152. At one end of the sleeve 240, a ramp surface 246 extends between the inner and outer surfaces 242 and 244. At the opposite end, the sleeve 240 includes a radially extending, manually engageable ring portion 248 having upper and lower surfaces 250 and 252.

The first spring 260 in the mechanism 90 is disposed in the cavity 130 in the housing 92 and encircles the link arm 70. One end of the first spring 260 extends around the main body portion 152 of the handle 150 and abuts the first flange 182. The other end of the first spring 260 fits over the pilot portion 122 of the lower end wall 104. The first spring 260 biases the handle 150, and thus the detent members 210 carried by the handle, away from the lower end wall 104 of the housing 92.

The second spring 270 in the mechanism 90 is located outside of the housing 92. The second spring 270 is positioned between the knob portion 170 of the handle 150 and the ring portion 248 of the sleeve 240. The second spring 270 encircles the main body portion 152 of the handle 150 adjacent the knob portion 170. The second spring 270 biases the sleeve 240 away from the knob portion 170 of the handle 150 and toward the end wall 188 of the detent carrier portion 180 of the handle.

The apparatus 10 also includes a device 280 (FIG. 3) for preventing movement of the sleeve 240 toward the knob portion 170 of the handle 150. The device 280 comprises a removable collar 282 that fits in an axial space 284 (FIG. 2) between the knob portion 170 and the ring portion 248 of the sleeve 240. As shown in FIG. 3, the collar 280 engages the arcuate surface 174 on the knob portion 170 and the upper surface 250 on the ring portion 248. The collar 280 includes a lock 286 that is operated, for example, by a vehicle ignition key 288. Upon insertion of the key 288 into the lock 286 in the collar 280, the collar can be removed so that relative movement between the sleeve 240 and the handle 150 can take place. Because relative movement between the sleeve 240 and the handle 150 is necessary for manual shifting of the transmission 14 to occur, the device 280 helps to prevent a potential vehicle thief from simply shifting the transmission into neutral.

FIG. 3 illustrates the mechanism 90 in a non-actuated first condition. In the first condition, the detent members 210 carried by the handle 150 are disposed in the groove 142 in the housing 92. The detent members 210 are biased radially outward into the groove 142 by the springs 222. In addition, the sleeve 240 slides behind, or radially inward of, the base portion 212 of each of the detent members 210 to hold the detent members in the position shown in FIG. 3. The sleeve 240 is biased into the position of FIG. 3 by the second spring 270.

In the first condition of FIG. 3, the end portion 76 of the link arm 70 is linearly movable relative to the mechanism 90 within the chamber 158 in the main body portion 152 of the handle 150. The upper and lower surfaces 84 and 86 of the collar 82 are not engaged with either of the first and second stop surfaces 162 and 164 in the chamber 158. The axial length of the chamber 158 between the stop surfaces 162 and 164 provide a lost motion distance that permits the linear movement of the link arm 70 relative to the handle 150 in both an upward direction A and a downward direction B. Such linear movement of the link arm 70 occurs as the input shaft 16 of the transmission 14 is rotated by the actuator 20 during normal operation (i.e. shifting) of the transmission due to the gear and linkage interconnection.

In the event of a failure of a component of the electronically controlled transmission system 10, the transmission 14 can be manually shifted into either "park" or "neutral" using the apparatus 50. To shift the transmission 14 into "neutral" so that, for example, the vehicle 12 may be more easily towed, the lockable collar 280 shown in FIG. 3 must first be removed. With the collar 280 removed, the sleeve 240 is manually pulled in the upward direction A against the bias of the second spring 270. The sleeve 240 moves in the upward direction A relative to the handle 150 and the detent members 210, and into the position of the sleeve illustrated in FIG. 2.

As may be seen in FIG. 2, the upward movement, or retraction, of the sleeve 240 pulls the sleeve out of engagement with the base portion 212 of the detent members 210. The detent members 210 are thereby unlocked and are able to move radially inward against the bias of the springs 222. The handle 150 is then grasped manually and pushed linearly in the downward direction B, causing the rounded tip 216 on each of the detent members 210 to cam out of the groove 142 and into engagement with the cylindrical inner surface 132 of the cavity 130. The camming action of the detent members 210 forces the detent members radially inward into the position shown in FIG. 2.

The handle 150 is pushed linearly downward against the bias of the first spring 260 until the detent members 210 reach the groove 140 in the housing 92. The bias of the springs 222 in the detent members 210 pushes the detent members radially outward into the groove 140 as shown in FIG. 4, which illustrates a second condition for the mechanism 90. When the detent members 210 are disposed in the groove 140, the bias of the second spring 270 pushes the sleeve 240 in the downward direction B behind the base portion 212 of the detent members to hold the detent members in the first groove. The angled surface 218 on the base portion 212 of each detent member 210 cooperates with the ramp surface 246 on the sleeve 240 to help the sleeve slide behind each detent member.

In the second condition of FIG. 4, undesirable additional downward movement of the handle 150 is prevented by the engagement of the end surface 156 on the main body portion 152 of the handle 150 with the stop surface 124.on the housing 92. Inside the handle 150, the guide portion 80 of the link arm 70 slides into the guide section 166 of the chamber 158 in the main body portion 152 of the handle. During the downward movement of the handle 150, the stop surface 162 engages the upper surface 84 of the collar 82 on the link arm 70, causing the link arm to be moved linearly downward along with the further downward movement of the handle after the engagement as the detent members 210 approach the groove 140. This downward linear movement of the link arm 70 causes the lever 60 to rotate the input shaft 16 to a position that shifts the transmission 14 into "neutral". It should be noted that a relatively long lever 60 decreases the magnitude of the manually applied force on the handle 150 needed to rotate the input shaft 16.

If, for example, a failure in the electronically controlled transmission system 10 occurred while driving the vehicle 12, it may be desirable to shift the transmission 14 into "park" to prevent the vehicle from rolling away. Assuming the mechanism 90 is the normal first condition shown in FIG. 3, the mechanism would need to be moved into the third condition shown in FIG. 5 in order to shift the transmission 14 into "park". First, the lockable collar 280 shown in FIG.

3 must be removed. With the collar 280 removed, the sleeve 240 is manually pulled in the upward direction A against the bias of the second spring 270. The sleeve 240 moves in the upward direction A relative to the handle 150 and the detent members 210, and into the position of the sleeve illustrated in FIG. 2.

As may be seen in FIG. 2, the upward movement, or retraction, of the sleeve 240 pulls the sleeve out of engagement with the base portion 212 of the detent members 210. The detent members 210 are thereby unlocked and are able to move radially inward against the bias of the springs 222. The handle 150 is then grasped manually and pulled linearly in the upward direction A, causing the rounded tip 216 on each of the detent members 210 to cam out of the groove 142 and into engagement with the cylindrical inner surface 132 above the second groove. The camming action of the detent members 210 forces the detent members radially inward.

The handle 150 is pulled linearly upward until the detent members 210 reach the groove 144 in the housing 92. The bias of the springs 222 in the detent members 210 pushes the detent members radially outward into the groove 144 as shown in FIG. 5. When the detent members 210 are disposed in the groove 144, the bias of the second spring 270 pushes the sleeve 240 in the downward direction B behind the base portion 212 of each of the detent members to hold the detent members in the groove 144. The angled surface 218 on the base portion 212 of each detent member 210 cooperates with the ramp surface 246 on the sleeve 240 to help the sleeve slide behind each detent member.

In the third condition of FIG. 5, undesirable additional upward movement of the handle 150 is prevented by the engagement of the second flange 202 on the detent carrier portion 180 of the handle with the end surface 106 on the housing 92. During the upward movement of the main body portion 152 of the handle 150, the stop surface 164 engages the lower surface 86 of the collar 82 on the link arm 70, causing the link arm to be moved linearly upward along with further upward movement of the handle as the detent members 210 approach the groove 144. This linear movement of the link arm 70 causes the lever 60 to rotate the input shaft 16 to a position that shifts the transmission 14 into "park".

FIG. 6 illustrates an alternate embodiment of the electronic actuator 20 shown in FIG. 1. The actuator 20' of FIG. 6 is connected directly to the input shaft 16 of the transmission 14 through appropriate gearing, rather than by the linkage 26 shown in FIG. 1. The actuator 20' of FIG. 6 functions identical to the actuator 20 of FIG. 1 to rotate the input shaft 16 in response to electrical signals from the ECU 30.

From the above description of the invention, those skilled in the art will perceive improvements, changes and modifications. For example, it should be understood that the spring-loaded detent members 210 disclosed above could be constructed differently, and that more than two detent members could be employed. Such improvements, changes and modifications within the skill of the art are intended to be covered by the appended claims.

Having described the invention, I claim:

1. A method for manually shifting an electrically controlled transmission to a desired gear setting in the event of a failure, said method comprising the steps of:
   unlocking a manual shift mechanism from a non-actuatable condition;
   linearly moving the manual shift mechanism from the non-actuated condition toward an engageable position with a link arm and linearly moving the link arm in response to further linear movement of the manual shift mechanism after engagement therewith; and
   rotating a transmission gear to manually shift the transmission to the desired gear setting through linear motion of the link arm.

2. The method of claim 1 wherein the step of rotating a transmission gear includes the step of translating linear motion of the link arm to rotational motion of the transmission gear through a lever pivotally connected to the link arm and to a rotatable gear of the transmission that manually selects gear settings.

3. The method of claim 1 wherein the step of unlocking the manual shift mechanism includes the step of retracting a spring-loaded detent member from a locked position to an unlocked position.

4. The method of claim 1 wherein the step of linearly moving the manual shift mechanism toward an engageable position includes the step of moving a coaxial outer sleeve surrounding the link arm a predetermined distance to overcome a lost motion distance between the outer sleeve and the link arm, further movement of the outer sleeve beyond the predetermined distance resulting in linear movement of the link arm.

5. An apparatus for manually shifting an electrically controlled transmission to a desired gear setting upon system failure, said apparatus comprising:
   a manual shift mechanism having an actuatable condition and a non-actuatable condition;
   a link arm slidably mounted within said manual shift mechanism and engageable by said manual shift mechanism upon linear movement of said manual shift mechanism beyond a predetermined amount, said link arm being moveable by said manual shift mechanism in response to further linear movement of said manual shift mechanism after engagement therewith; and
   a rotatable transmission gear coupled with said link arm so that linear movement of said link arm by said manual shift mechanism rotates said transmission gear to the desired gear setting.

6. The apparatus of claim 5 further comprising a lever pivotally connected to said link arm and to the rotatable gear of the transmission that manually selects gear settings, said lever translating linear motion of said link arm into rotational motion of the transmission gear.

7. The apparatus of claim 5 wherein said manual shift mechanism includes a spring-loaded detent member that retracts from a locked position to an unlocked position to unlock said manual shift mechanism from said non-actuatable condition.

8. The apparatus of claim 5 wherein said manual shift mechanism further comprises a coaxial member surrounding a portion of said link arm and defining a lost motion distance between said link arm and said member, said member being movable relative to said link arm until said lost motion distance is overcome and thereafter further movement of said member resulting in linear movement of said link arm.

9. The apparatus of claim 5 further comprising a key-operated locking device for preventing movement of said manual shift mechanism from said non-actuatable condition.

10. An apparatus for manually shifting gears in an electronically controlled transmission in the event of a system failure, the transmission having a rotatable input shaft for selecting between the gears, said apparatus comprising:
   a link arm coupled with the input shaft, said link arm being linearly movable to cause rotation of the input shaft; and a manually engageable mechanism engageable with said link arm and movable relative to said link arm, said mechanism being linearly movable to cause said link arm to move linearly and to thereby manually select a gear in the transmission.

11. The apparatus of claim 10 wherein said mechanism includes a lever connecting said link arm to the input shaft of the transmission, said lever translating linear movement of said link arm into rotational movement of the input shaft to select a gear in the transmission.

12. The apparatus of claim 10 wherein said mechanism includes a manually engageable, axially extending handle, said handle surrounding a portion of said link arm.

13. The apparatus of claim 12 wherein said handle includes a chamber and said link arm includes a collar disposed in said chamber, said collar being engageable with opposing end surfaces of said chamber to cause said linear movement of said link arm in opposing directions.

14. The apparatus of claim 12 wherein said mechanism includes at least one detent member, said at least one detent member being spring-biased radially outward away from said handle and being supported for radial movement by a detent carrier portion of said handle.

15. The apparatus of claim 14 wherein said mechanism further comprises a sleeve surrounding a portion of said handle, said sleeve being axially movable relative to said handle and relative to said at least one detent member, said sleeve being engageable with said at least one detent member to hold said at least one detent member in a locked position, said sleeve being retractable to disengage from said at least one detent member so that said at least one detent member can move radially inward against its spring bias.

16. The apparatus of claim 15 further comprising a key-operated locking device for preventing movement of said sleeve relative to said handle.

17. The apparatus of claim 14 wherein said mechanism further includes a housing having a cavity, said handle being disposed in said cavity, said cavity having a plurality of annular grooves for receiving said at least one detent member, said grooves being spaced axially apart.

18. The apparatus of claim 17 wherein said mechanism has a first condition in which said at least one detent member is disposed in a first one of said grooves and said link arm is axially movable relative to said handle to permit rotation of the input shaft to occur through electronic control, said mechanism having a second condition in which said at least one detent member is disposed in a second one of said grooves and said link arm is engaged with said handle, wherein movement of said mechanism from said first condition to said second condition manually rotates the input shaft to shift gears in the transmission.

19. The apparatus of claim 17 wherein said mechanism further includes a return spring for biasing said handle away from an end wall of said housing.

20. An apparatus for manually shifting gears in an electronically controlled transmission in the event of a system failure, the transmission having a rotatable input shaft for selecting between the gears, said apparatus comprising:
a movable link arm coupled with the input shaft for rotating the input shaft; and
a manually engageable mechanism engageable with said link arm for moving said link arm, said mechanism having a first axial position in which said link arm is disengaged from said mechanism and the selection of gears is electronically controlled, said mechanism having a second axial position in which said link arm is engaged by said mechanism, wherein manual movement of said mechanism from said first axial position to said second axial position causes rotation of the input shaft through movement of said link arm and thereby manually selects a gear in the transmission.

21. The apparatus of claim 20 wherein said mechanism includes a lever connecting said link arm to the input shaft of the transmission, said lever translating linear movement of said link arm into rotational movement of the input shaft to select a gear.

22. The apparatus of claim 20 wherein said mechanism includes a manually engageable, axially extending handle, said handle surrounding a portion of said link arm.

23. The apparatus of claim 22 wherein said handle includes a chamber and said link arm includes a collar disposed in said chamber, said collar being engageable with opposing end surfaces of said chamber to cause said linear movement of said link arm in opposing directions.

24. The apparatus of claim 23 wherein said mechanism includes at least one detent member, said at least one detent member being spring-biased radially outward away from said handle and being supported for radial movement by a detent carrier portion of said handle.

25. The apparatus of claim 24 wherein said mechanism further comprises a sleeve surrounding a portion of said handle, said sleeve being axially movable relative to said handle and relative to said at least one detent member, said sleeve being engageable with said at least one detent member to hold said at least one detent member in a locked position, said sleeve being retractable to disengage from said at least one detent member so that said at least one detent member can move radially inward against its spring bias.

26. The apparatus of claim 25 further comprising a key-operated locking device for preventing movement of said sleeve relative to said handle.

27. An electronically controlled transmission apparatus comprising:
a transmission having a plurality of gears and a rotatable input shaft for shifting between said gears;
an electronic actuator connected with said input shaft for rotating said input shaft in response to an input signal;
a link arm coupled with said input shaft, said link arm being linearly movable to cause rotation of said input shaft; and
a manually engageable mechanism engageable with said link arm and movable relative to said link arm, said mechanism being linearly movable to cause said link arm to move linearly and to thereby manually shift said gears in said transmission in the event of a failure in said apparatus.

28. The apparatus of claim 27 wherein said mechanism includes a lever connecting said link arm to the input shaft of the transmission, said lever translating linear movement of said link arm into rotational movement of the input shaft to select a gear.

29. The apparatus of claim 27 wherein said mechanism includes a handle surrounding a portion of said link arm, said handle being engageable with surfaces on said link arm to cause said linear movement of said link arm in opposing directions.

30. The apparatus of claim 29 wherein said mechanism includes at least one detent member, said at least one detent member being spring-biased radially outward and being supported for radial movement by said handle.

31. The apparatus of claim 30 wherein said mechanism further comprises a sleeve surrounding a portion of said handle, said sleeve being axially movable relative to said handle, said sleeve being movable relative to said at least one detent member and being engageable with said at least one detent member.

32. The apparatus of claim 30 wherein said mechanism further includes a housing having a plurality of annular grooves for receiving said at least one detent member, said grooves being spaced axially apart.

33. The apparatus of claim 32 wherein said mechanism has a first condition in which said at least one detent member is disposed in a first one of said grooves and said link arm is axially movable relative to said handle to permit rotation of the input shaft to occur through electronic control, said mechanism having a second condition in which said at least one detent member is disposed in a second one of said grooves and said link arm is engaged with said handle, wherein movement of said mechanism from said first condition to said second condition manually rotates the input shaft to shift gears in the transmission.

34. The apparatus of claim 27 further comprising a key-operated locking device for preventing movement of said mechanism relative to said link arm.

35. An electronically controlled transmission system for a vehicle comprising:
 a transmission having a plurality of gears and a rotatable input shaft for shifting between said gears;
 an electronic actuator connected to said input shaft for rotating said input shaft in response to an input signal;
 a link arm coupled with said input shaft, said shaft being movable in response to shifting of said gears in said transmission by said actuator; and
 a manually engageable mechanism engageable with said link arm and movable relative to said link arm, said mechanism being movable to manually shift said gears in said transmission upon a failure in said system to shift said gears,
 said mechanism including lost motion means for permitting movement of said link arm relative to said mechanism when said gears in said transmission are shifted by said actuator.

36. The apparatus of claim 35 wherein said mechanism includes a lever connecting said link arm to the input shaft of the transmission, said lever translating linear movement of said link arm into rotational movement of the input shaft to select a gear.

37. The apparatus of claim 35 wherein said mechanism includes a manually engageable handle, said handle surrounding a portion of said link arm, said handle being engageable with surfaces on said link arm to cause said linear movement of said link arm in opposing directions.

38. The apparatus of claim 37 wherein said mechanism includes at least one detent member, said at least one detent member being spring-biased radially outward away from said handle and being supported for radial movement by a detent carrier portion of said handle.

39. The apparatus of claim 38 wherein said mechanism further includes a housing having a plurality of annular grooves for receiving said at least one detent member, said mechanism having a first condition in which said at least one detent member is disposed in a first one of said grooves and said link arm is axially movable relative to said handle to permit rotation of the input shaft to occur through electronic control, said mechanism having a second condition in which said at least one detent member is disposed in a second one of said grooves and said link arm is engaged with said handle, wherein movement of said mechanism from said first condition to said second condition manually rotates the input shaft to shift gears in the transmission.

* * * * *